（12）United States Patent
Chin

(10) Patent No.: US 7,535,138 B2
(45) Date of Patent: May 19, 2009

(54) REVERSIBLE SUBMERGED MOTOR

(76) Inventor: Chi-Der Chin, 85-1, Shuiyuan Road, Taipei (TW)

( * ) Notice: Subject to any disclaimer, the term of this patent is extended or adjusted under 35 U.S.C. 154(b) by 569 days.

(21) Appl. No.: 11/414,471

(22) Filed: Apr. 27, 2006

(65) Prior Publication Data

US 2007/0252458 A1 Nov. 1, 2007

(51) Int. Cl.
*H02K 5/12* (2006.01)
*H02K 47/00* (2006.01)
*F04B 17/00* (2006.01)

(52) U.S. Cl. .................. 310/87; 417/423.12; 417/423.3; 417/423.5

(58) Field of Classification Search ............... 310/87, 310/89; 417/410.3, 423.12–423.15, 423.3, 417/423.5, 423.9, 366
See application file for complete search history.

(56) References Cited

U.S. PATENT DOCUMENTS 5,040,954 A * 8/1991 Iwai ...................... 417/423.12
5,648,694 A * 7/1997 Kobayashi et al. ............ 310/87
5,997,261 A * 12/1999 Kershaw et al. ............. 417/366
6,174,143 B1 * 1/2001 Horski et al. ............... 417/366
7,226,277 B2 * 6/2007 Dooley ....................... 417/356
2004/0234395 A1 * 11/2004 Hatano ....................... 417/420
2005/0019184 A1 * 1/2005 Geisinger et al. ......... 417/423.3

* cited by examiner

Primary Examiner—Tran N Nguyen
(74) Attorney, Agent, or Firm—Pro-Techtor Int'l Services

(57) ABSTRACT

A reversible submerged motor includes a double open end housing with an inside bracket, a barrel-like axle holder, which is affixed to the bracket of the housing and holds a winding around a tubular axle thereof, and a vane holder, which has a shaft pivotally supported in the tubular axle of the barrel-like holder, magnets equiangularly arranged outside the barrel-like axle holder corresponding to the winding, and a vane disposed outside the housing for moving water, two slotted semispherical caps respectively fastened to the two distal ends of the housing, two guards respectively fastened to the two ends of the housing around the semispherical caps for controlling water flowing angle, and a controller with a timer for controlling forward/backward alternative rotation time of the vane holder.

5 Claims, 7 Drawing Sheets

REVERSIBLE SUBMERGED MOTOR

BACKGROUND OF THE INVENTION

1. Field of the Invention

The present invention relates to a submerged motor and more particularly, to a reversible, power-saving, high-speed, high output, low-noise, compact-size submerged motor.

2. Description of the Related Art

A conventional submerged motor for use in an aquarium, as shown in FIG. 1, comprises a housing 11, which defines therein a chamber 11 that accommodates a shaft 12. The shaft 12 has a vane 13 provided at the front end thereof. A winding 14 is mounted in the housing 11 around the chamber 11. A cylindrical magnet 15 is fixedly connected to the rear end of the shaft 12 and accommodated in the chamber 11. By means of induction between the winding 14 and the cylindrical magnet 15, the shaft 12 is caused to rotate the vane 13 in moving water in the aquarium to produce air bubbles. This design of submerged motor is functional, however it consumes much electric energy and causes vibration and noise during operation. Further, this design of submerged motor has a huge size. The low revolving speed of this design of submerged motor does not satisfy the demand.

SUMMARY OF THE INVENTION

The present invention has been accomplished under the circumstances in view. It is therefore the main object of the present invention to provide a reversible, power-saving, high-speed, high output, low-noise, compact-size submerged motor.

To achieve this and other objects of the present invention, the submerged motor comprises a hollow cylindrical, double open end housing, the housing having a bracket fixedly provided on the inside and a plurality of mounting holes spaced around the periphery of each of two distal ends thereof; a barrel-like axle holder fixedly mounted inside the housing, the barrel-like axle holder having an axially extending tubular axle and a winding fixedly mounted on the inside around the tubular axle; a vane holder capped on one end of the barrel-like axle holder, the vane holder having a shaft rotatably supported in the tubular axle of the barrel-like axle holder, a plurality of magnets equiangularly provided at a first side thereof outside the barrel-like axle holder and adapted to act with the winding for causing the vane holder to rotate relative to the barrel-like axle holder, and a vane fixedly provided at a second side thereof and disposed outside the barrel-like axle holder; two semispherical caps respectively fastened to the two distal ends of the housing, the semispherical caps each having a plurality of longitudinal slots and a plurality of raised positioning portions respectively engaged into the mounting holes of the housing; two guards respectively coupled and rotatable relative to the semispherical caps, the guards each having a coupling ring portion respectively coupled to the semispherical caps and a semispherical shade extending from one side of the coupling ring; a transformer electrically connected to the winding and adapted to convert AC power supply into DC power supply for the working of the winding; and a controller electrically connected to the transformer and the winding for controlling supply of electric current from the transformer to the winding.

DETAILED DESCRIPTION OF THE PREFERRED EMBODIMENT

Figure 1:
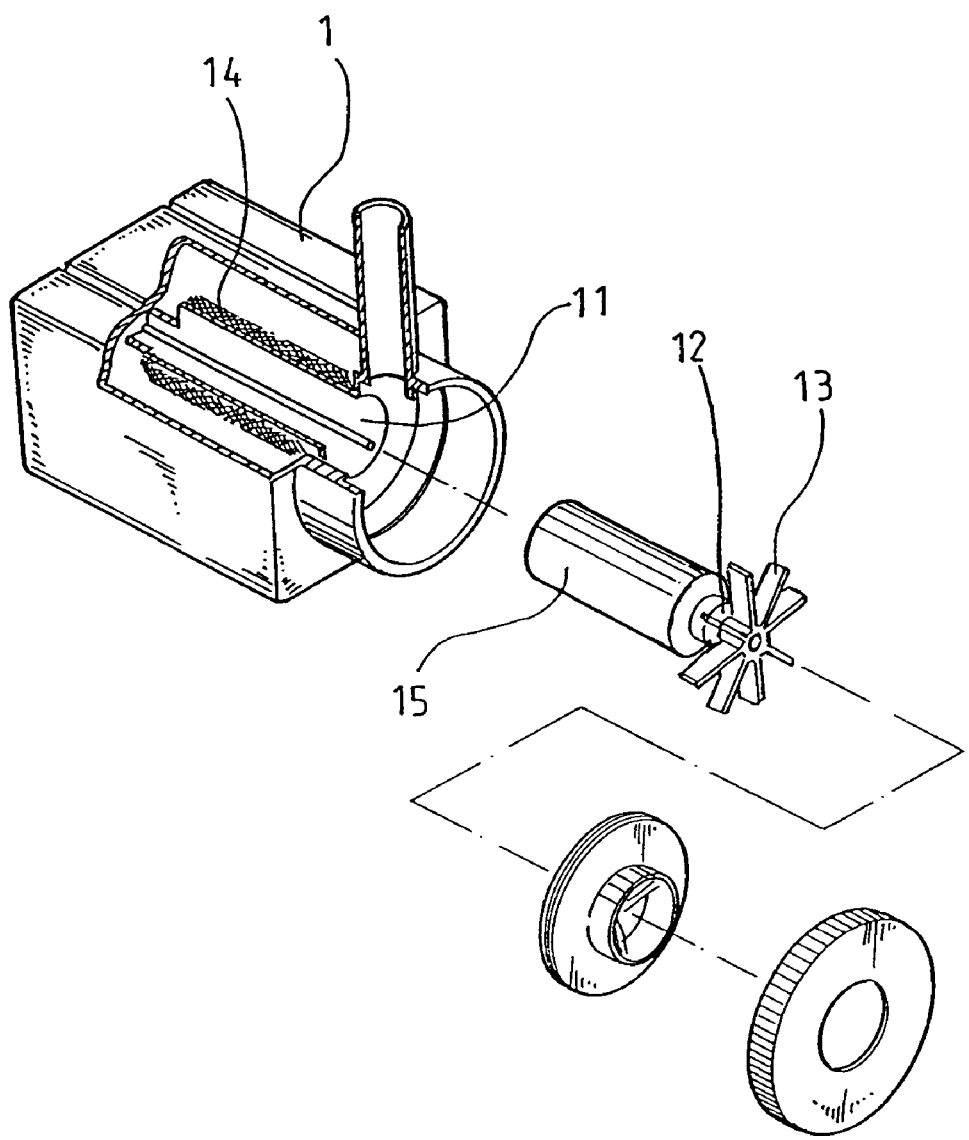
FIG. 1 is an exploded view of a submerged motor according to the prior art.
Figure 2:
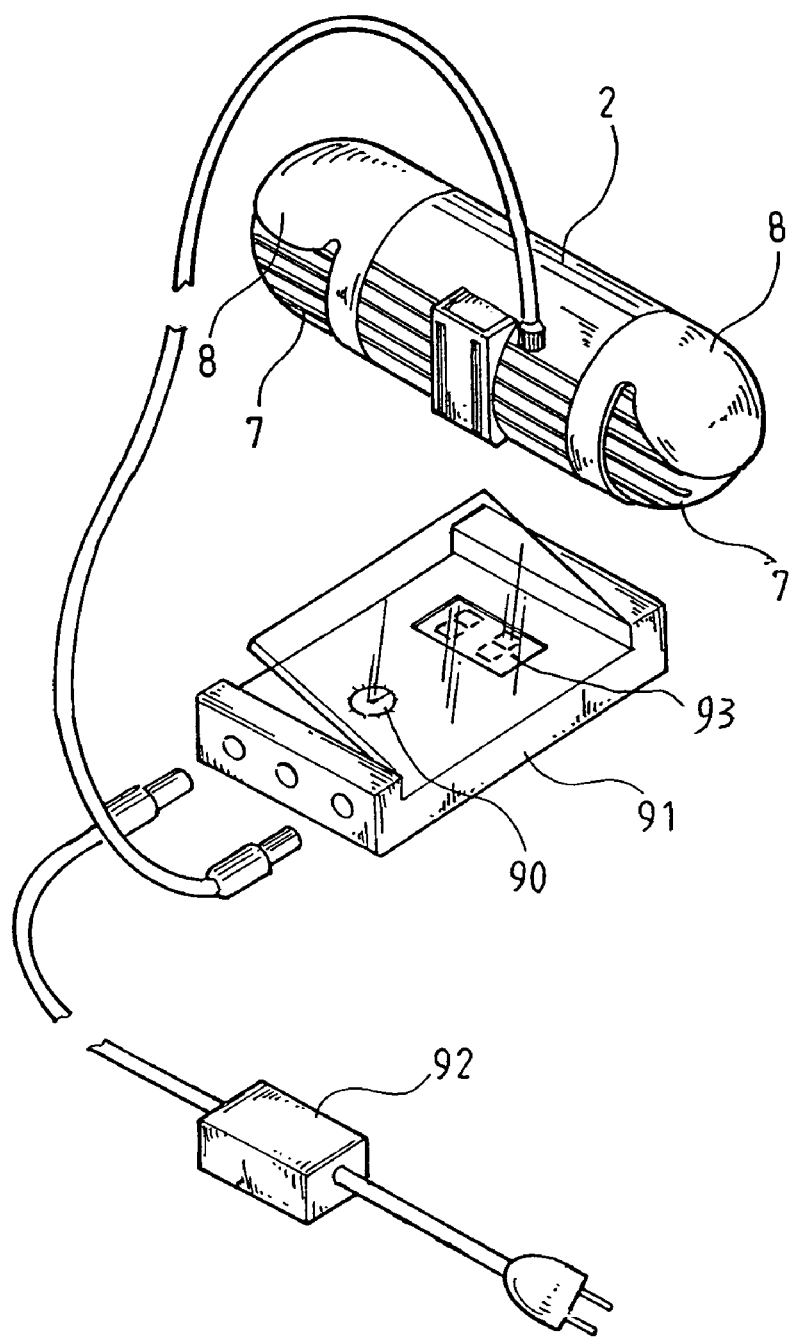
FIG. 2 is a perspective view of a reversible submerged motor according to the present invention.
Figure 3:
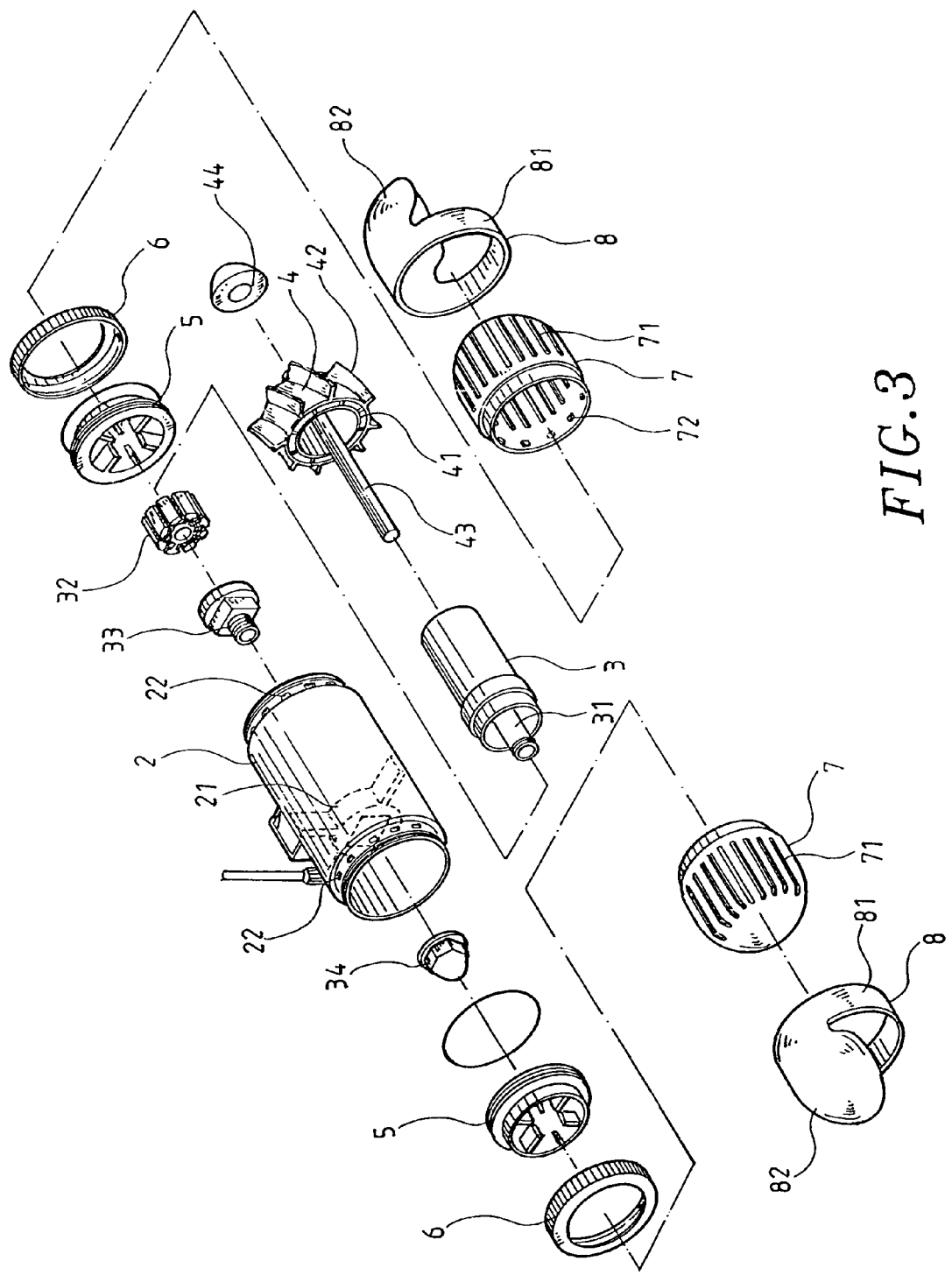
FIG. 3 is an exploded view of the reversible submerged motor according to the present invention.

Referring to FIGS. 2 and 3, a reversible submerged motor in accordance with the present invention is shown comprising a hollow, cylindrical double open end housing 2. The housing 2 has a bracket 21 fixedly mounted on the inside on the middle, and a plurality of mounting holes 22 respectively equiangularly spaced around each of the two opposite open ends. A barrel-like axle holder 3 is fixedly fastened to the bracket 21 inside the housing 2 with a screw member 33 and a locknut 34, having an axially extending tubular axle 31. A winding 32 is sleeved onto the tubular axle 31 and affixed to the inside of the barrel-like axle holder 3.

A cap-like vane holder 4 is rotatably capped on one end of the barrel-like axle holder 3 and suspending inside the housing 2, having a center shaft 43 pivotally supported in the tubular axle 31 of the barrel-like axle holder 3, a plurality of magnets 41 equiangularly arranged at one end around the center shaft 43 and disposed outside the battle-like axle holder 3 corresponding to the winding 32, and a vane 42 formed integral with the periphery. A water guide cone 44 is respectively fixedly fastened to each of the two distal ends of the center shaft 43.

Two ring caps 6 are respectively fastened to the two distal ends of the housing 2 to hold a respective water guide member 5.

Two semispherical caps 7 are respectively fastened to the two distal ends of the housing 2 around the ring caps 6, each having a plurality of longitudinal slots 71 and a plurality of raised positioning portions 72 respectively engaged into the mounting holes 22 of the housing 2.

Two guards 8 are respectively coupled and rotatable relative to the semispherical caps 7, each having a coupling ring portion 81 respectively coupled to the semispherical caps 7 and a semispherical shade 82 extending from one side of the coupling ring 81.

After connection of electricity to the winding 32, induction between the winding 32 in the barrel-like axle holder 3 and the magnets 41 at the vane holder 4 causes rotation of the vane 42 with the vane holder 4. The guards 8 control the flowing angle of water.

Figure 4:
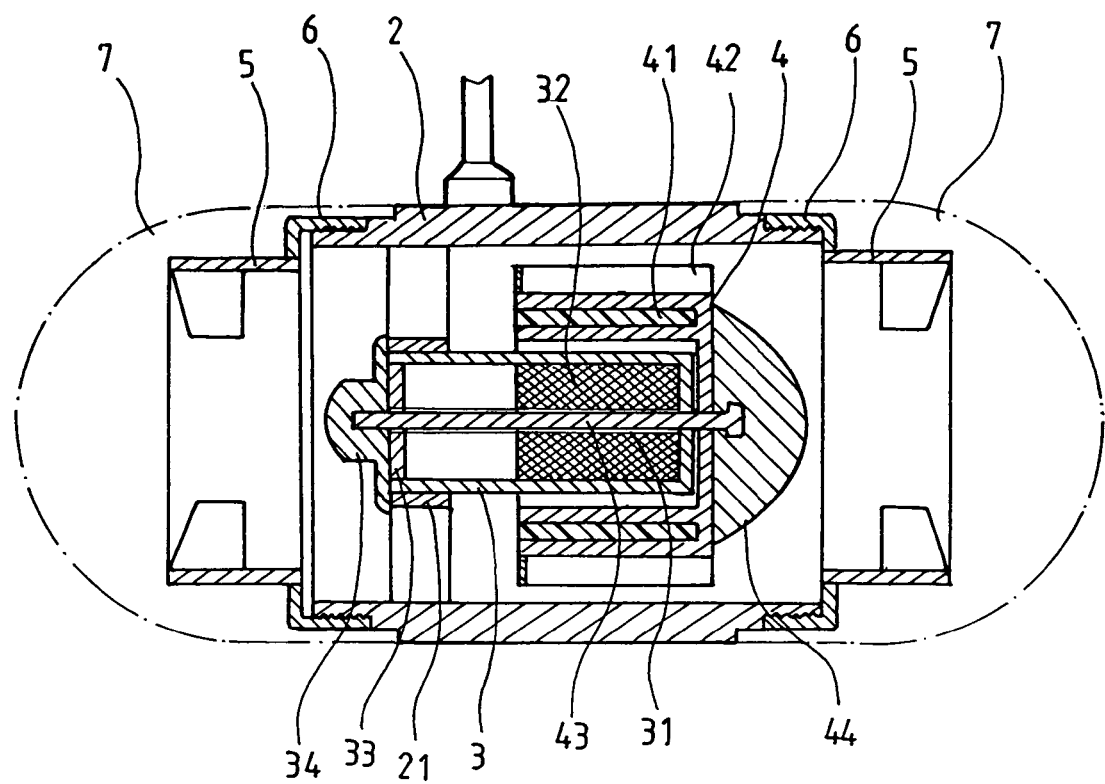
FIG. 4 is a sectional view of the reversible submerged motor according to the present invention.

Referring to FIG. 4, the reversible submerged motor is used with a controller 91 and a transformer 92. The controller 91 comprises a timer 93 for controlling forward/backward alternative rotation time of the vane holder 4, and a control knob 90 for regulating the volume of water passing through the housing 2. Further, the transformer 92 converts AC power supply into the desired working voltage for the reversible submerged motor.

Figure 5:
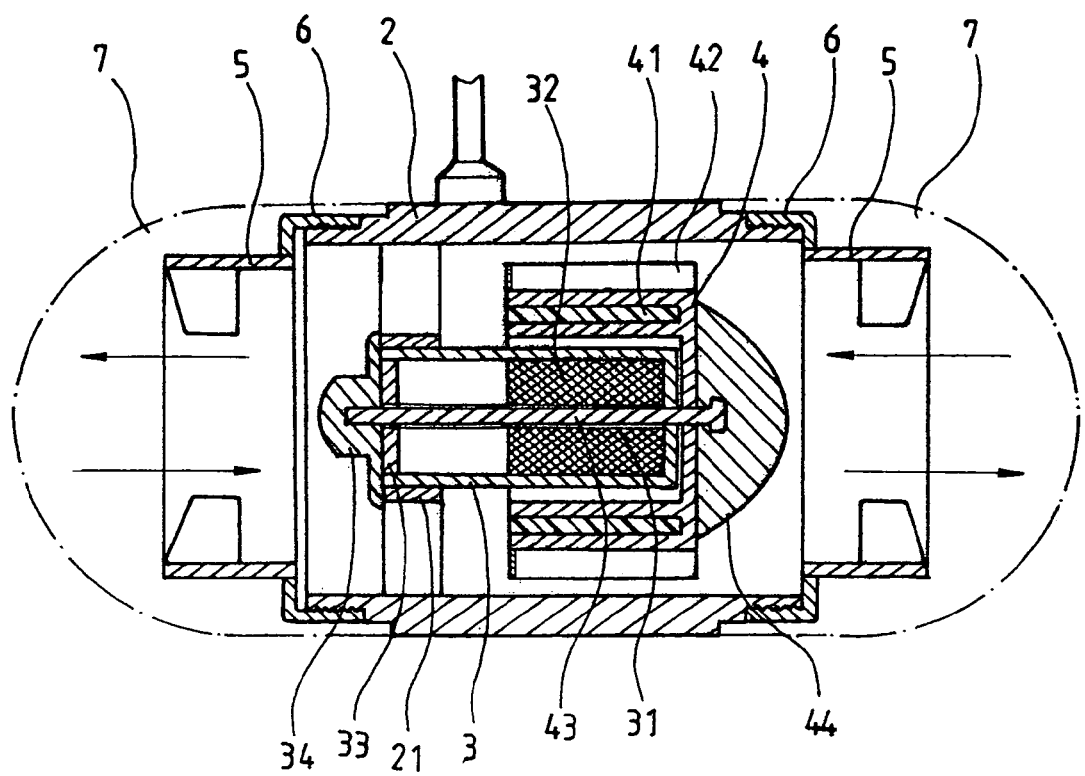
FIG. 5 is a schematic drawing showing an operation status of the reversible submerged motor according to the present invention.

Referring to FIG. 5, the winding 32 in the barrel-like axle holder 3 induces the magnets 41 at the vane holder 4, causing rotation of the vane 42 with the vane holder 4 to draw water through the housing 2.

Figure 6:
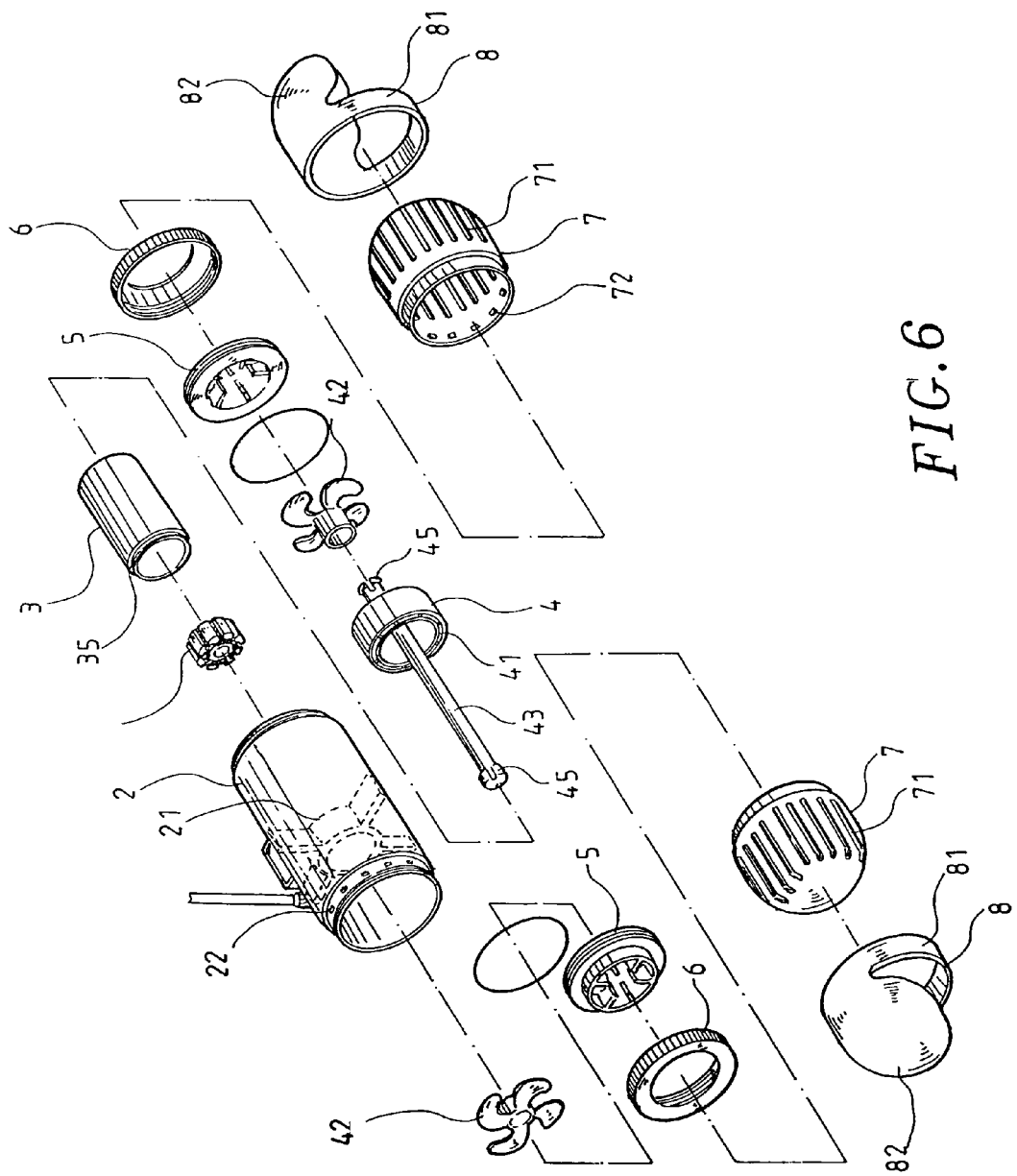
FIG. 6 is an exploded view of an alternate form of the reversible submerged motor according to the present invention.

FIG. 6 shows an alternate form of the reversible submerged motor according to the present invention. According to this embodiment, the barrel-like axle holder 3 has an outer thread 35 extending around the periphery of one end thereof and threaded into the center screw hole (not shown) of the bracket 21; the vane holder 4 has two fan blade assemblies 42 respectively fastened to the two mounting ends 45 of the center shaft 43 thereof. The fan blade assemblies 42 rotate with the vane holder 4 during operation of the reversible submerged motor.

Figure 7:
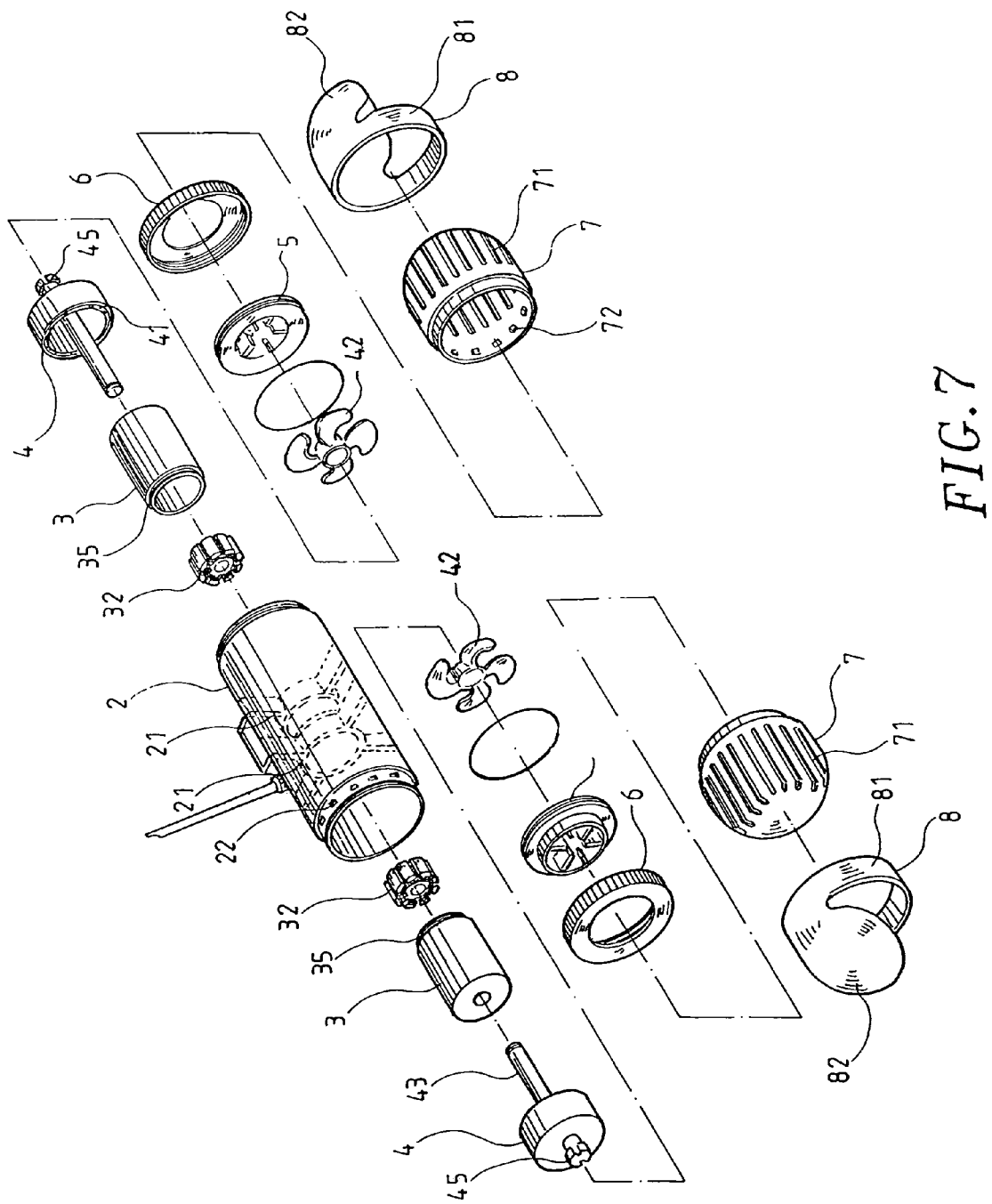
FIG. 7 is an exploded view of another alternate form of the reversible submerged motor according to the present invention.

FIG. 7 shows another alternate form of the reversible submerged motor according to the present invention. According to this embodiment, the housing 2 has two brackets 21 arranged in parallel on the inside to support two barrel-like axle holders 3, and two vane holders 4 are respectively pivotally coupled to the barrel-like axle holders 3. This embodiment enhances the working efficiency of the reversible submerged motor.

Although particular embodiments of the invention have been described in detail for purposes of illustration, various modifications and enhancements may be made without departing from the spirit and scope of the invention.

What the invention claimed is:

1. A reversible submerged motor comprising:
    a hollow cylindrical, double open end housing, said housing having a bracket fixedly provided on the inside and a plurality of mounting holes spaced around the periphery of each of two distal ends thereof;
    a barrel-shaped axle holder fixedly mounted inside said housing, said barrel-shaped axle holder having an axially extending tubular axle and a winding fixedly mounted on the inside around said tubular axle;
    a vane holder capped on one end of said barrel-like axle holder, said vane holder having a shaft rotatably supported in said tubular axle of said barrel-shaped axle holder, a plurality of magnets equiangularly provided at a first side thereof outside said barrel-shaped axle holder and adapted to act with said winding for causing said vane holder to rotate relative to said barrel-shaped axle holder, and a vane fixedly provided at a second side thereof disposed outside said barrel-shaped axle holder;
    two semispherical caps respectively fastened to the two distal ends of said housing, said semispherical caps each having a plurality of longitudinal slots and a plurality of raised positioning portions respectively engaged into the mounting holes of said housing;
    two guards respectively coupled and rotatable relative to said semispherical caps, said guards each having a coupling ring portion respectively coupled to said semispherical caps and a semispherical shade extending from one side of said coupling ring;
    a transformer electrically connected to said winding and adapted to convert AC power supply into DC power supply for the working of said winding; and
    a controller electrically connected to said transformer and said winding for controlling supply of electric current from said transformer to said winding.

2. The reversible submerged motor as claimed in claim 1, further comprising two water guide cones respectively fixedly fastened to two distal ends of said center shaft of said vane holder.

3. The reversible submerged motor as claimed in claim 1, further comprising two fan blade assemblies respectively affixed to two distal ends of said center shaft of said vane holder.

4. The reversible submerged motor as claimed in claim 1, wherein said housing further comprises a second bracket fixedly provided on the inside, a second barrel-shaped axle holder fastened to said second bracket, and a second vane holder rotatably capped on said second-barrel-shaped axle holder.

5. The reversible submerged motor as claimed in claim 1, wherein said controller has a control knob for regulating the volume of water passing through said housing.

\* \* \* \* \*